(12) United States Patent
Stonecipher

(10) Patent No.: US 10,068,198 B2
(45) Date of Patent: Sep. 4, 2018

(54) FACTORY INVENTORY SYSTEM UTILIZING THE NATURAL FREQUENCY OF A PALLET RACK

(71) Applicant: Caterpillar Inc., Peoria, IL (US)

(72) Inventor: Kenneth Stonecipher, Metamora, IL (US)

(73) Assignee: Caterpillar Inc., Deerfield, IL (US)

(*) Notice: Subject to any disclaimer, the term of this patent is extended or adjusted under 35 U.S.C. 154(b) by 475 days.

(21) Appl. No.: 14/866,048

(22) Filed: Sep. 25, 2015

(65) Prior Publication Data

US 2017/0091701 A1    Mar. 30, 2017

(51) Int. Cl.
| | |
|---|---|
| *G06Q 10/08* | (2012.01) |
| *B65G 1/02* | (2006.01) |
| *B65G 17/00* | (2006.01) |
| *G01S 5/00* | (2006.01) |
| *G05B 19/00* | (2006.01) |

(52) U.S. Cl.
CPC .............. *G06Q 10/087* (2013.01); *B65G 1/02* (2013.01)

(58) Field of Classification Search
CPC ............ B65G 1/02; B65G 17/002; B65G 2201/0267; G06Q 10/087; G01N 33/54366; G01S 11/14; G01S 3/30; G01S 5/0009; G01S 5/18; G05B 19/4155; G05B 2219/31319; G05B 2219/36508
See application file for complete search history.

(56) References Cited

U.S. PATENT DOCUMENTS

| | | | | |
|---|---|---|---|---|
| 4,226,118 A | * | 10/1980 | Aldrich | G01F 23/284 331/65 |
| 4,247,922 A | * | 1/1981 | Jackson | B66F 9/0755 128/201.19 |
| 4,589,281 A | * | 5/1986 | Aldrich | G01F 23/22 73/290 R |
| 4,604,724 A | * | 8/1986 | Shaginian | E21B 19/20 166/53 |
| 6,851,313 B2 | * | 2/2005 | Fehrenbach | G01F 23/2967 73/290 R |
| 8,755,931 B2 | | 6/2014 | Issing | |

(Continued)

FOREIGN PATENT DOCUMENTS

| | | | |
|---|---|---|---|
| CN | 201804348 | | 4/2011 |
| CN | 2017-432596 | * | 5/2017 |

(Continued)

OTHER PUBLICATIONS file:///C:/Users/damsdell/Downloads/9788132219699-c2.pdf, pp. 24-25. (Year: 2014).*

*Primary Examiner* — Florian M Zeender
*Assistant Examiner* — Dana Amsdell
(74) *Attorney, Agent, or Firm* — Miller, Matthias & Hull; Jeff A. Greene

(57) ABSTRACT

A controller-implemented method for managing inventory of pallets on a pallet rack is provided. The controller-implemented method may include engaging a plurality of exciters to generate a rack frequency in the pallet rack, receiving the rack frequency at a plurality of corresponding harvesters, detecting variations between the rack frequency generated by the exciters and the rack frequency received by the harvesters, and detecting one or more load characteristics of pallets on the pallet rack based on the variations.

14 Claims, 4 Drawing Sheets

(56) References Cited

U.S. PATENT DOCUMENTS

| | | | |
|---|---|---|---|
| 8,882,432 B2 | 11/2014 | Bastian, II et al. | |
| 2008/0183599 A1 | 7/2008 | Hill et al. | |
| 2015/0023773 A1* | 1/2015 | Redman | B65G 59/063 |
| | | | 414/797.5 |
| 2015/0268028 A1* | 9/2015 | Hirota | G03G 15/5029 |
| | | | 324/207.17 |
| 2016/0003648 A1* | 1/2016 | Barfoot | G01D 5/35338 |
| | | | 250/227.19 |
| 2016/0204717 A1* | 7/2016 | Li | H02N 2/181 |
| | | | 310/319 |
| 2016/0218272 A1* | 7/2016 | Capobianco | F04B 43/046 |
| 2017/0344936 A1* | 11/2017 | Sharp, Jr. | G06K 7/10297 |

FOREIGN PATENT DOCUMENTS

| | | |
|---|---|---|
| DE | 102011100910 | 5/2011 |
| WO | 2006116665 | 11/2006 |
| WO | 2014160085 | 10/2014 |

\* cited by examiner

FACTORY INVENTORY SYSTEM UTILIZING THE NATURAL FREQUENCY OF A PALLET RACK

TECHNICAL FIELD

The present disclosure relates generally to factory inventory systems, and more particularly, to systems and methods for managing factory inventory.

BACKGROUND

Inventory storage systems are used within various warehouses and manufacturing facilities to organize products, components, parts, assemblies and other items for retrieval and storage. Often, inventory items to be stored in such facilities are placed on pallets that are sized and shaped to facilitate the transport of such items within or around the warehouse or facility. For example, pallets can be structured to be easily lifted and carried by forklifts used within the facility. Alternatively, some inventory items may be transported and stored without being placed on pallets. In either manner, the inventory items may be stored on multi-platform or multi-level pallet racks within a given facility. Due to the vast number of inventory items that are typically stored as well as the substantial number of possible pallet rack locations and positions where those items can be placed, organizing and tracking inventory can be a demanding task.

Conventional inventory management systems often employ optics-based systems to track pallets. For example, U.S. Pat. No. 8,882,432 ("Bastian, II") discloses an automated storage and retrieval system which employs robotics-guided placement of pallets, as well as laser depth sensors and three-dimensional computerized models to track the position of pallets. However, systems like Bastian, II which rely on optics, computerized models and other estimations are susceptible to errors. Such optics-based systems also provide limited information with regards to the inventory, and for instance, are not capable of providing more intuitive feedback as to the weight of the individual pallets, the cumulative weight of pallets on a given pallet rack, the relative positions of pallets on a given rack, the number of pallets per pallet or pallet rack, the stability of pallets on a pallet rack, and the like. Furthermore, systems such as in Bastian, II require a substantial amount of new infrastructure and are not readily retrofittable to existing pallet racks.

In view of the foregoing disadvantages associated with conventional inventory management and tracking systems, a need exists for a more retrofittable solution, which minimizes the need for additional infrastructure and provides reliable information with respect to each pallet and pallet rack. Moreover, there is a need to provide additional feedback relating to the stability and safety of each pallet or pallet rack. There is also a need for a solution that is capable of easily digitalizing the manual aspects of storing inventory for implementation with remote and/or automated management techniques.

SUMMARY OF THE DISCLOSURE

In one aspect of the present disclosure, a controller-implemented method for managing inventory of pallets on a pallet rack is provided. The controller-implemented method may include engaging a plurality of exciters to generate a rack frequency in the pallet rack, receiving the rack frequency at a plurality of corresponding harvesters, detecting variations between the rack frequency generated by the exciters and the rack frequency received by the harvesters, and detecting one or more load characteristics of pallets on the pallet rack based on the variations.

In another aspect of the present disclosure, a system for managing inventory of pallets on a pallet rack is provided. The system may include one or more exciters coupled to a first end of the pallet rack configured to generate a rack frequency in the pallet rack, one or more harvesters coupled to a second end of the pallet rack configured to receive the rack frequency and generate an electrical signal corresponding to the rack frequency, and a controller in electrical communication with at least the harvesters. The controller may be configured to receive the electrical signal from the harvesters, detect variations between the rack frequency generated by the exciters and the rack frequency received by the harvesters, and detect one or more load characteristics of pallets on the pallet rack based on the variations.

In yet another aspect of the present disclosure, a system for managing inventory of pallets on a plurality of pallet racks is provided. The system may include a first set of harvesters coupled to a first pallet rack, a second set of harvesters coupled to a second pallet rack, and a controller. The first set of harvesters may be configured to generate a first set of electrical signals corresponding to a first set of rack frequencies detected in the first pallet rack. The second set of harvesters may be configured to generate a second set of electrical signals corresponding to a second set of rack frequencies detected in the second pallet rack. The controller may be configured to receive the first and second sets of electrical signals, detect the first and second sets of rack frequencies, and detect one or more load characteristics of pallets on the first and second pallet racks based on the first and second sets of rack frequencies.

DETAILED DESCRIPTION

Figure 1:
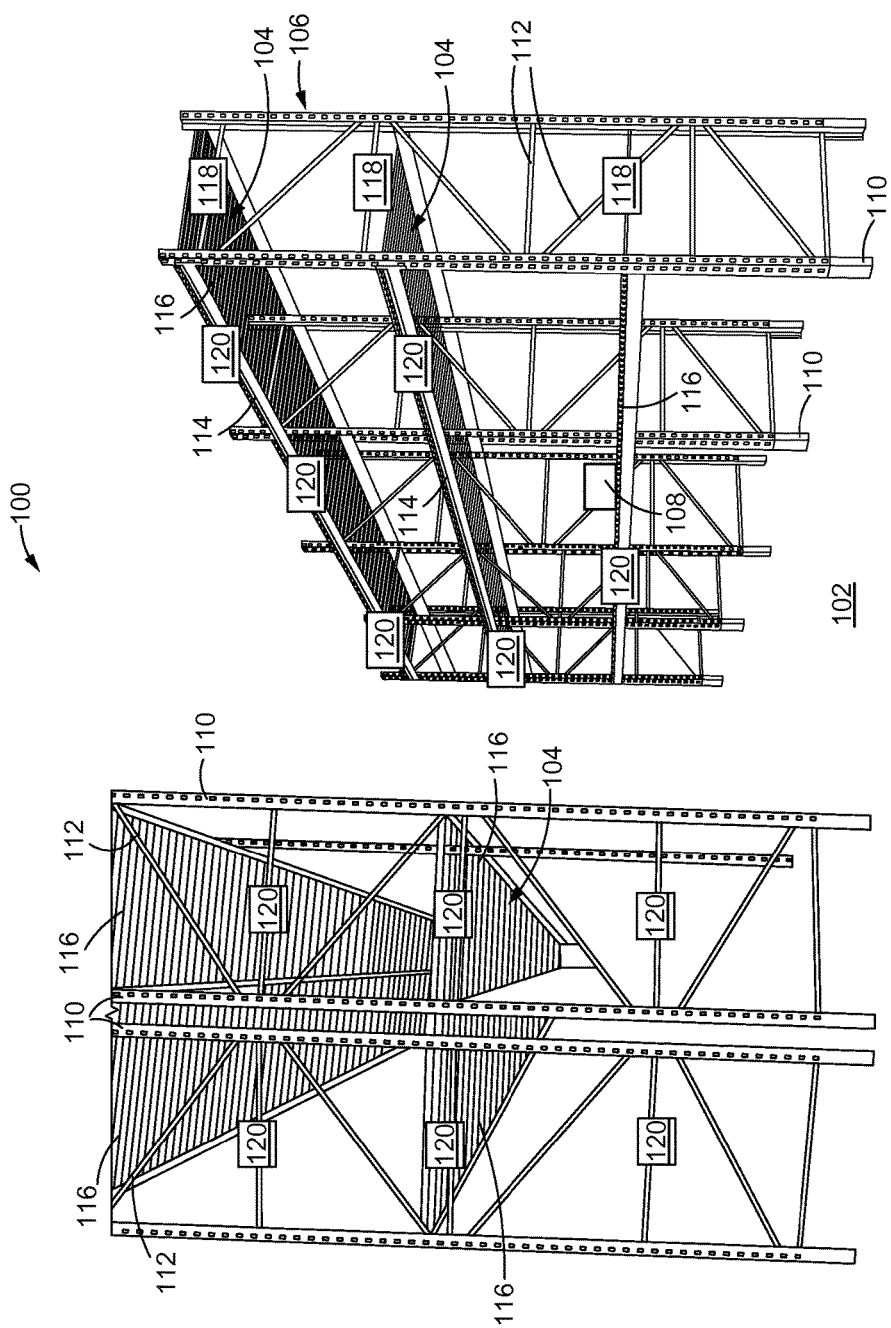
FIG. 1 is an annotated perspective view of a facility implementing an exemplary inventory management system of the present disclosure.

Referring now to FIG. 1, one exemplary inventory management system 100 that may be implemented or retrofitted in a storage or manufacturing facility 102 is provided. As shown, rows of pallet racks 104 may be aligned along aisles within the facility 102, and each row of pallet racks 104 may be configured to include one or more vertically separated levels 106 of pallet racks 104 capable of supporting one or more pallets 108 thereon. More specifically, each row of pallets racks 104 may include a plurality of upright frames 110 that are held in place by a combination of braces 112, horizontal support beams 114, and the like. Furthermore, each pallet rack 104 may include pallet supports 116 that are horizontally disposed between the support beams 114 and configured to withstand the weight of loaded pallets 108 or other loads thereon. The pallet supports 116 may employ any one or more of wire meshes, plates, planks, rails, or the like, that are formed of steel or any other suitable material capable of supporting the typical weight of a loaded pallet 108. The shape, size, materials and arrangement used for the pallet supports 116 may also be configured to enable mechanical vibrations or other natural frequencies to be at least partially communicated therethrough.

Figure 2:
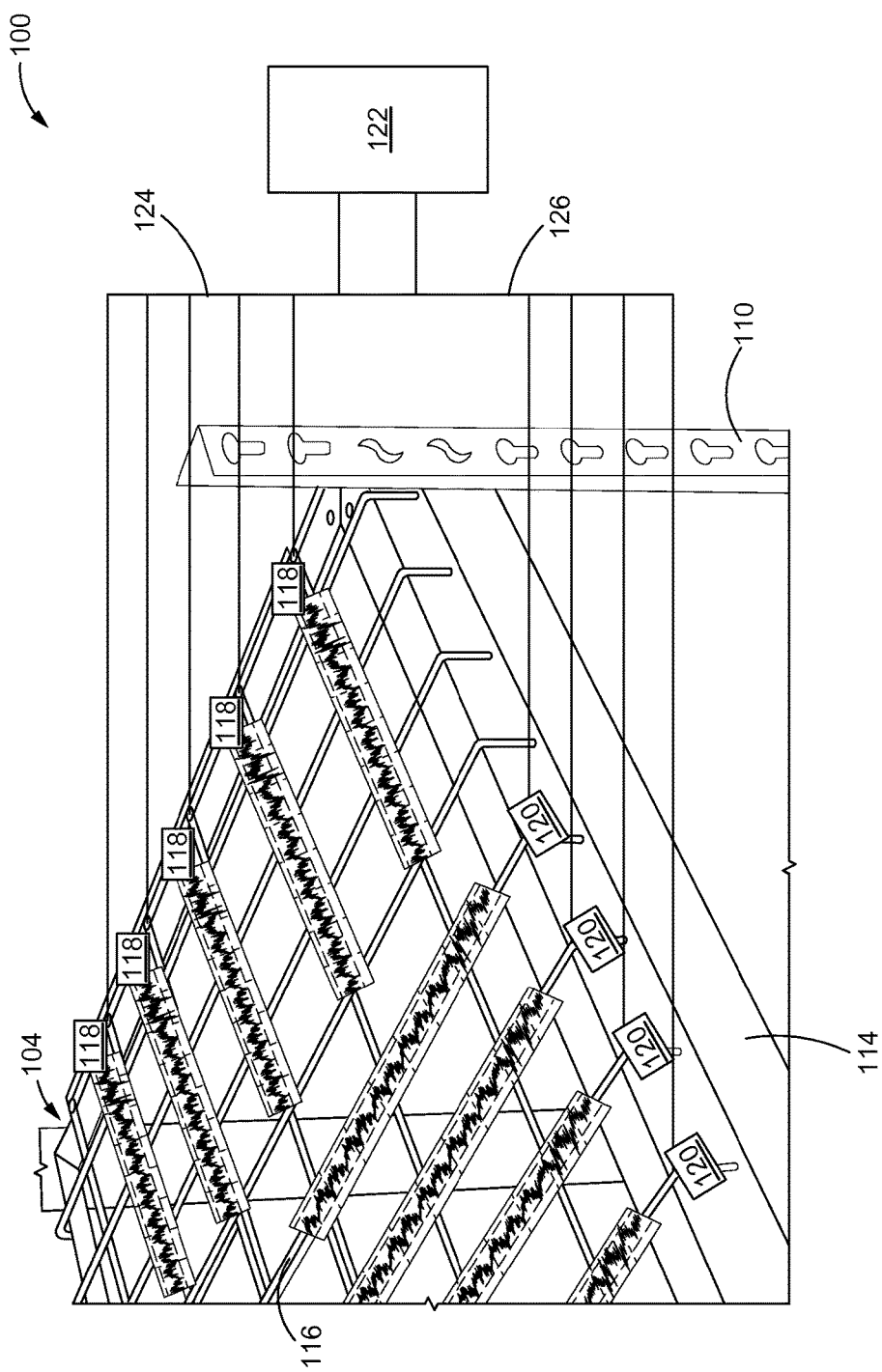
FIG. 2 is a schematic illustration of an exemplary inventory management system of the present disclosure as implemented onto a pallet rack.

In addition, as shown schematically in FIG. 1 and as shown in more detail in FIG. 2, an inventory management system 100 may be implemented or installed in conjunction with one or more of the pallet racks 104 of a given facility 102. Specifically, the inventory management system 100 may generally include one or more exciters 118, one or more corresponding energy harvesters 120, and at least one controller 122 in communication with the exciters 118 and harvesters 120. An exciter 118 may include a piezoelectric device or any other transducer capable of converting electrical energy into mechanical energy, for example, an electronic device capable of generating a mechanical vibration of a known default frequency. A harvester 120 may include a piezoelectric device, an electrodynamic device, a magnetoinductive device, or any other electronic device capable of converting vibratory or other forms of mechanical energy received at an input thereof into corresponding electrical signals.

Furthermore, the exciters 118 in FIG. 1 may be installed in direct contact with the supports 116 of the pallet rack 104 and configured to selectively induce mechanical vibrations therethrough. The harvesters 120 may also be installed in direct contact with the supports 116 and configured to detect and receive the mechanical vibrations and any variations thereof. The controller 122 may generally be configured to activate or enable the exciters 118 to induce mechanical vibrations of a known default frequency through the pallet rack 104, as well as activate or enable the harvesters 120 to receive the mechanical vibrations and detect for any frequency deviations or variations that may be indicative of an existing pallet 108. The controller 122 may be implemented using any one or more of a processor, a microprocessor, a microcontroller, field programmable gate arrays (FPGAs), various forms of programmable read-only memory (PROMs), or any other electronically programmable device.

As shown in FIG. 2, for example, the exciters 118 may be provided along a first end of the pallet rack 104, and the harvesters 120 may be provided along a second end of the pallet rack 104 that is adjacent to or opposite of the first end. The inventory management system 100 may be scalable such that, depending on the type or material of the supports 116 being used and the amount of pallet feedback that is desired, fewer or more exciters 118 and harvesters 120 may be provided. For example, using a greater number of exciters 118 and corresponding harvesters 120 uniformly distributed along the respective ends of the pallet rack 104 may not only provide a greater area of coverage of the pallet rack 104, but may also provide feedback or load characteristics with greater resolution and precision per pallet rack 104. In other embodiments, a single exciter 118 may be provided with a single corresponding harvester 120 to provide adequate results. In still further alternatives, a single exciter 118 may be employed with a plurality of harvesters 120, or a plurality of exciters 118 may be employed with a single harvester 120. Other arrangements and configurations may also be possible and will be apparent to those skilled in the art.

Still referring to FIG. 2, the controller 122 may generally be configured to communicate with one or more of the exciters 118, such as via the electrical signals 124, and with one or more of the harvesters 120, such as via the electrical signals 126, as shown. More specifically, the controller 122 may operate one or more of the exciters 118 and the harvesters 120 and execute functions of the inventory management system 100 according to one or more preprogrammed algorithms, sequences of predefined instructions, or the like. For example, the controller 122 may generate electrical signals 124 that are configured to engage the exciters 118 and induce mechanical vibrations through the supports 116 of a pallet rack 104 having a known or default rack frequency. The controller 122 may also, substantially simultaneously, receive the electrical signals 126 from the harvesters 120, determine any variations between the default rack frequency generated by the exciters 118 and the rack frequency received by the harvesters 120, and determine one or more load characteristics of any pallets 108 on the pallet rack 104 based on the variations.

Although the controller 122 in FIG. 2 is shown to be in communication with each of the exciters 118 and harvesters 120, other variations or arrangements are possible. For example, the inventory management system 100 may be arranged such that the controller 122 communicates with only the harvesters 120 through electrical signals 126 and not with the exciters 118. Such an arrangement may be possible if the exciters 118 can be activated and/or engaged to generate the default rack frequency through the pallet rack 104 at least partially autonomously or by a separate dedicated controller. In other modifications, the inventory management system 100 may be implemented using more than one controller 122. For example, any combination of controllers, processors, or other computational devices may be configured to collectively perform the functions of the controller 122 in FIG. 2. Furthermore, any one or more of the controllers, processors, or other computational devices of the inventory management system 100 may be locally situated or remotely situated relative to the facility 102, such as via one or more networks, or the like.

Figure 3:
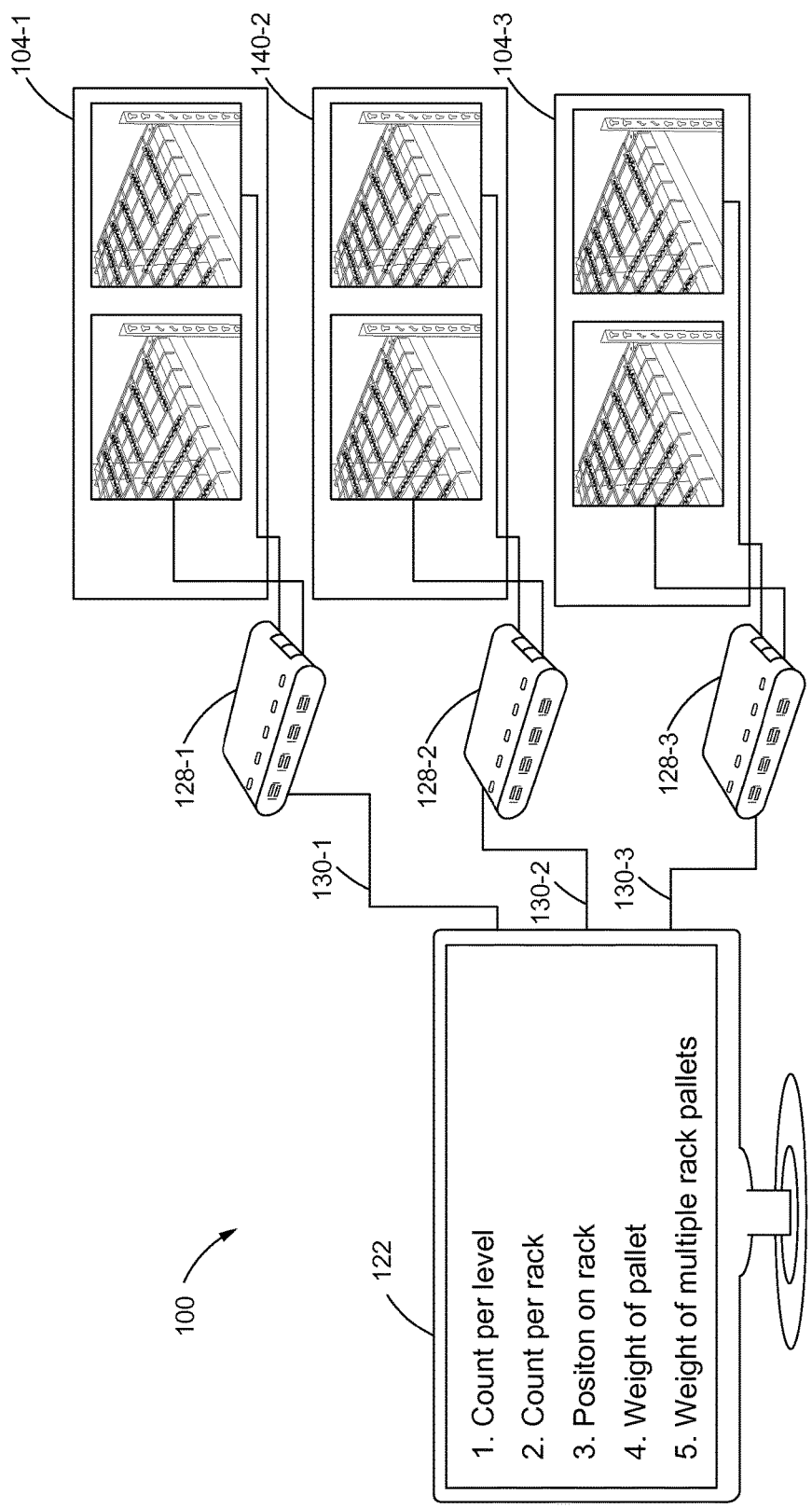
FIG. 3 is a schematic illustration of another exemplary inventory management system of the present disclosure as implemented onto a plurality of pallet racks.

Turning now to FIG. 3, yet another embodiment of the inventory management system 100 is provided. As shown, the inventory management system 100 may also be scalable for and implemented with larger applications, for instance, to simultaneously monitor inventory stored on multiple pallet racks 104, rows of pallet racks 104, levels of pallet racks 104, and the like. Similar to the embodiment of FIG. 2, each pallet rack 104 may be provided with one or more exciters 118 installed in direct contact with the supports 116 and configured to selectively induce or generate mechanical vibrations therethrough. Each pallet rack 104 may also be provided with one or more corresponding energy harvesters 120 installed in direct contact with the supports 116 and configured to detect and receive the mechanical vibrations and any variations thereof. As in FIG. 2, the inventory management system 100 of FIG. 3 may also provide a central controller 122 that is configured to activate or enable the exciters 118 to induce mechanical vibrations of a known default frequency through the pallet rack 104, and activate or enable the harvesters 120 to receive the mechanical vibrations and detect for any frequency deviations or variations that may be indicative of an existing pallet 108.

In contrast with the embodiment of FIG. 2, the controller 122 in FIG. 3 may be configured to simultaneously communicate, either directly or indirectly, with one or more of the exciters 118 and harvesters 120 associated with a plurality of different pallet racks 104. As shown, the inventory management system 100 may further include one or more multiplexers 128. A multiplexer 128 may include any electrically controlled switch device, such as a multiple-input, single-output device, that is configured to simultaneously receive a plurality of different electrical signals at a plurality of different inputs, and pass through a selected one of those electrical signals at its output. Moreover, the electrical signal that is selected to be output may be determined, for instance, based on instructions received from the controller 122. In other embodiments, the multiplexer 128 may be used in conjunction with a demultiplexer, or other single-input, multiple-output device, for instance, to route a single incoming electrical signal through one or more of selected outputs.

In the embodiment of FIG. 2, each of the multiplexers 128 may communicate with the exciters 118 and harvesters 120 of a predefined set of pallet racks 104, and provide a single electrical signal 130 to the controller 122 that can be representative of the associated set of pallet racks 104. For example, a first multiplexer 128-1 may be configured to communicate directly with the exciters 118 and the harvesters 120 of a first set of pallet racks 104-1, such as via electrical signals 124, 126, to provide the controller 122 with a first electrical signal 130-1, while a second multiplexer 128-2 may be configured to communicate with the exciters 118 and the harvesters 120 of a second set of pallet racks 104-2 to provide the controller 122 with a second electrical signal 130-2, and so on. Furthermore, the controller 122 of FIG. 3 may transmit information to and/or receive information from the exciters 118 and the harvesters 120 of the plurality of pallet racks 104 via the multiplexers 128 and respective electrical signals 130. Still further, the multiplexers 128 may be configured to transmit and receive the electrical signals 130 in a manner which identifies or tracks the originating or destination pallet rack 104.

Based on the information collected from at least the harvesters 120, either directly or indirectly via one or more multiplexers 128, the controller 122 may be configured to assess one or more load characteristics, or characteristics of any loads or pallets 108 that may be placed on the associated pallet racks 104. For example, the controller 122 may monitor for any variations in frequency detected between the default rack frequency of the mechanical vibrations sourced by the exciters 118 and the resulting rack frequency of the mechanical vibrations sensed by the harvesters 120. Based on the frequency variations that are detected, the controller 122 may be programmed to determine load characteristics pertaining to any one or more of the weight of the pallets 108 per pallet rack 104, the weight of the pallets 108 per level 106, the weight of the pallets 108 per set of pallet racks 104, the relative positions of the pallets 108 on the pallet racks 104, the number of pallets 108 per pallet rack 104, the number of pallets 108 per level 106, the number of pallets 108 per set of pallet racks 104, the stability of the pallets 108 on a pallet rack 104, the stability of a level of pallet racks 104, the stability of a set of pallet racks 104, and the like.

INDUSTRIAL APPLICABILITY

In general terms, the present disclosure sets forth systems and methods for tracking and managing inventory. Although applicable to any type of inventory system, the present disclosure may be particularly applicable to storage facilities, manufacturing facilities or any other industrial setting where inventory is frequently changing and where substantially real-time tracking of such inventory is desired. In general, the present disclosure provides a system for tracking the attenuation of natural mechanical vibrations or rack frequencies between exciters and energy harvesters arranged on adjacent or opposing ends of a pallet rack. By employing mechanical vibrations rather than radio frequencies, the actual presence or absence of pallets and other loads on individual pallet racks can be more reliably and accurately assessed. Furthermore, by employing minimal but scalable hardware, the present disclosure provides a simplified solution for tracking inventory that can be easily retrofitted onto existing pallet racks or newly implemented with substantially less infrastructure. In addition, by using a more intuitive sensing mechanism, the present disclosure can be integrated into existing computerized systems to local and/or remotely monitor for potential safety hazards or other significant events.

Figure 4:
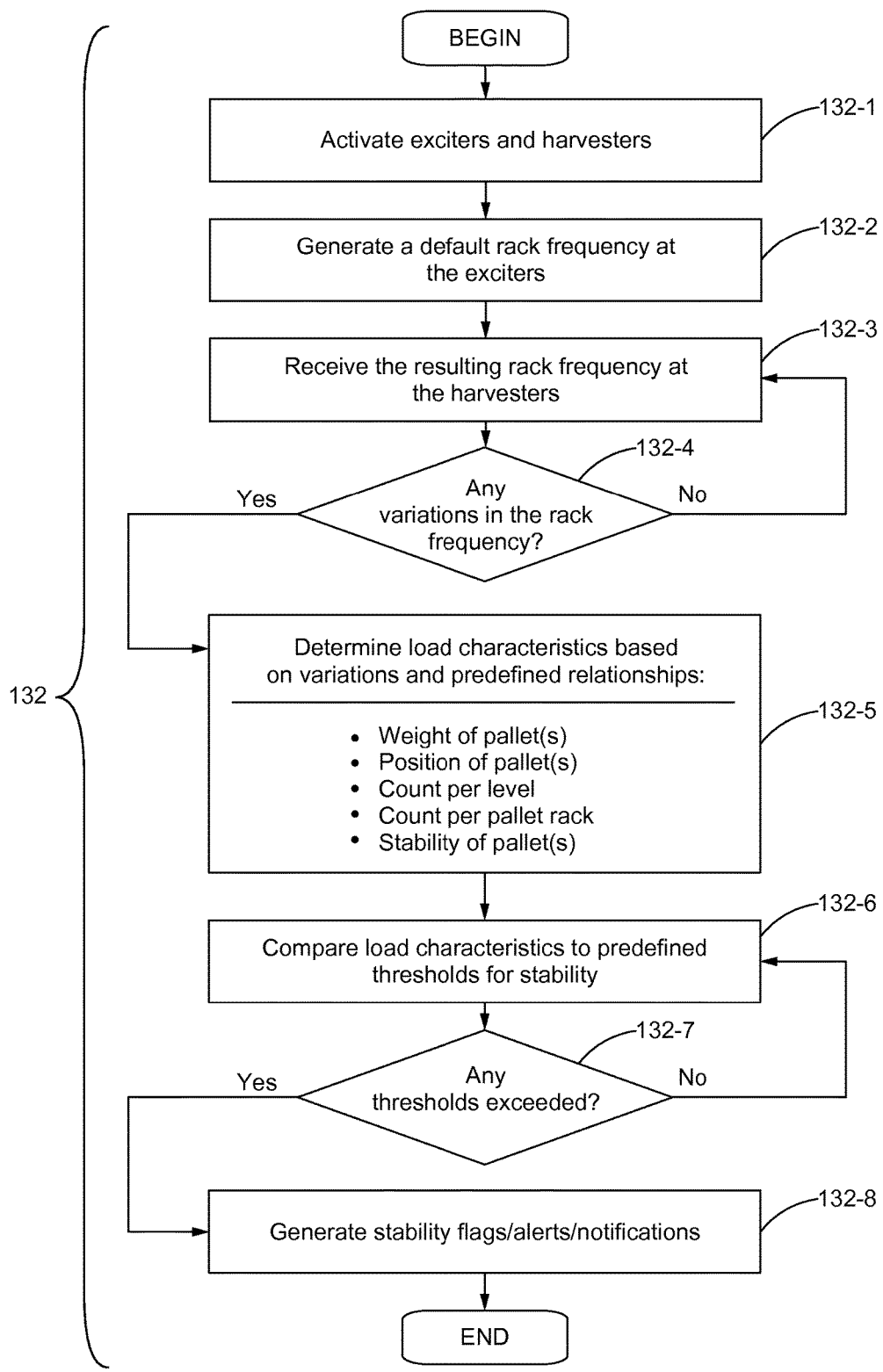
FIG. 4 is a flowchart illustrating an exemplary disclosed method by which a controller may track and manage inventory.

One exemplary algorithm or controller-implemented method 132 for managing inventory of loads or pallets 108 within a facility 102 is diagrammatically provided in FIG. 4. As shown, the controller 122 in block 132-1 may initially activate or enable the exciters 118 via electrical signals 124 and the harvesters 120 via electrical signals 126 of the pallet rack 104 to be monitored. In embodiments employing multiplexers 128 such as in FIG. 3, the controller 122 may transmit electrical signals 130 capable of activating the exciters 118 and the harvesters 120 to the respective multiplexers 128, which may further communicate the corresponding electrical signals 124, 126 to the exciters 118 and harvesters 120. Furthermore, in block 132-2, the controller 122 may engage the exciters 118 to begin generating or inducing mechanical vibrations through the supports 116 of the pallet rack 104 having a known default rack frequency. Depending on the configuration or capabilities of the individual exciters 118, the controller 122 may alternatively be configured to simply activate the exciters 118 as in block 132-1, which may in turn enable the exciters 118 to autonomously begin generating mechanical vibrations at the default rack frequency either continuously or periodically at predefined intervals.

The mechanical vibrations generated by the exciters 118 in block 132-2 of FIG. 4 may at least partially resonate through the supports 116 of the pallet racks 104 to be received by the harvesters 120. The controller 122 may correspondingly receive the resulting rack frequency of the mechanical vibrations detected by the harvesters 120 in block 132-2. Based on the known default rack frequency, the resulting rack frequency, and any difference or variation therebetween, the controller 122 in block 132-4 may be configured to determine if a load or pallet 108 exists on the associated pallet rack 104. For example, if the resulting rack frequency detected by the harvesters 120 is substantially similar to the default rack frequency, aside from frequency variations caused by natural losses, the controller 122 may determine that the pallet rack 104 is not loaded and return to block 132-3 to continue monitoring the harvesters 120. If, however, the resulting rack frequency detected by the harvesters 120 indicates a frequency variation amounting to more than those caused by natural losses, the controller 122 may proceed to block 132-5 to make further assessments.

In block 132-5 of FIG. 4, the controller 122 may compare the frequency variations to predefined relationships to determine one or more load characteristics of the loaded pallet rack 104. For example, the controller 122 may be configured to determine load characteristics pertaining to any one or more of the weight of the pallets 108 per pallet rack 104, the weight of the pallets 108 per level 106, the weight of the pallets 108 per set of pallet racks 104, the relative positions of the pallets 108 on the pallet racks 104, the number of pallets 108 per pallet rack 104, the number of pallets 108 per level 106, the number of pallets 108 per set of pallet racks 104, the stability of the pallets 108 on a pallet rack 104, the stability of a level of pallet racks 104, the stability of a set of pallet racks 104, and the like. The predefined relationships may include preprogrammed lookup tables, maps, or the like, which associate different load characteristics with various possible combinations of frequencies that may be detected by the harvesters 120, and determine load characteristics based on the combination of feedback provided by the harvesters 120.

Any variety of predefined relationships may be applied in block 132-5 of FIG. 4. In one embodiment, the controller 122 may determine the approximate weight of a load or pallet 108 on a given pallet rack 104 based on the magnitude of frequency attenuation that is detected by the harvesters 120. For example, the frequency of mechanical vibrations that are induced by exciters 118 on one end of a pallet rack 104 and ultimately received by harvesters 120 on another end of the pallet rack 104 may be more attenuated when heavier pallets 108 are placed therebetween. The controller 122 may also determine the relative position and/or size of a load or pallet 108 on a pallet rack 104 by comparing the individual rack frequencies detected by an array of harvesters 120 provided within a given pallet rack 104. For example, if an array of harvesters 120 is distributed along an end of a pallet rack 104 as shown in FIG. 2, harvesters 120 exhibiting significant frequency variations may indicate the presence of a pallet 108, and harvesters 120 exhibiting substantially no frequency variations may indicate the absence of a pallet 108. Furthermore, additional load characteristics, such as pallet counts, stability, and the like, may be derived based on the weight and/or position of the loads or pallets 108.

Once the desired load characteristics have been determined, the controller 122 may optionally or additionally be configured to compare the load characteristics with predefined thresholds so as to determine the stability of the pallet racks 104 in block 132-6 of FIG. 4. For example, based on the weights and/or positions of the pallets 108 that are loaded onto a given pallet rack 104, and based on comparisons with thresholds which may be preprogrammed and/or defined by an operator, the controller 122 may determine whether any pallet rack 104 is overloaded, unbalanced, or otherwise posing a safety risk. If no such thresholds are exceeded, the controller 122 in block 132-7 may return to block 132-6 to continue monitoring for potential safety hazards. If, however, one or more predefined thresholds are exceeded in block 132-7, the controller 122 may proceed to block 132-8 to generate flags, alerts, notifications, alarms, or other means for notifying operators of the safety risk. In other embodiments, the controller 122 in blocks 132-6, 132-7 and 132-8 may be configured to observe for other user-defined thresholds which may or may not be related to stability or safety.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A method for managing inventory of pallets on a pallet rack, comprising:
engaging, by a controller, a plurality of exciters coupled to a first end of the pallet rack to generate a first rack frequency in the pallet rack;
receiving a second rack frequency at a plurality of corresponding harvesters coupled to a second end of the pallet rack;
sending an electrical signal from the harvesters to the controller corresponding to the second rack frequency;
detecting by the controller, variations between the rack first frequency generated by the exciters and the second rack frequency received by the harvesters; and
detecting by the controller, one or more load characteristics of pallets on the pallet rack based on the variations.

2. The controller-implemented method of claim 1, wherein the exciters are coupled to a first end of the pallet rack and the harvesters are coupled to a second end of the pallet rack.

3. The controller-implemented method of claim 1, wherein the exciters are configured to generate the rack frequency in the form of mechanical vibrations vibrating at a default rack frequency.

4. The controller-implemented method of claim 1, wherein the harvesters are configured to receive the rack frequency and variations thereof caused by placement of one or more pallets on the pallet rack.

5. The controller-implemented method of claim 1, wherein the harvesters are configured to receive the rack frequency, and generate an electrical signal corresponding to the rack frequency.

6. The controller-implemented method of claim 1, wherein the load characteristics include one or more of weight per pallet rack, relative position per pallet rack, count per level of pallet rack, count per pallet rack, and stability of pallets on pallet rack.

7. The controller-implemented method of claim 1, wherein the load characteristics are detected based on predefined relationships between the rack frequency and the load characteristics.

8. The controller-implemented method of claim 1, further comprising comparing the load characteristics with predefined thresholds, and generating notifications if the load characteristics exceed one or more of the predefined thresholds.

9. A system for managing inventory of pallets on a pallet rack, comprising:
one or more exciters coupled to a first end of the pallet rack configured to generate a first rack frequency in the pallet rack;
one or more harvesters coupled to a second end of the pallet rack configured to receive a second rack frequency and generate an electrical signal corresponding to the second rack frequency; and
a controller in electrical communication with the one or more exciters and the one or more harvesters, the controller being configured to:
engage the one or more exciters,
receive the electrical signal from the harvesters,
detect variations between the first rack frequency generated by the exciters and the second rack frequency received by the harvesters, and
detect one or more load characteristics of pallets on the pallet rack based on the variations.

10. The system of claim 9, wherein the exciters are configured to generate the rack frequency at a default rack frequency, and the harvesters are configured to receive the rack frequency and variations thereof caused by placement of one or more pallets on the pallet rack.

11. The system of claim 9, wherein the load characteristics include one or more of weight per pallet rack, relative position per pallet rack, count per level of pallet rack, count per pallet rack, and stability of pallets on pallet rack.

12. The system of claim 9, wherein the controller is configured to detect the load characteristics based on predefined relationships between the rack frequency and the load characteristics.

13. The system of claim 9, wherein the controller is configured to compare the load characteristics with predefined thresholds, and generate notifications if the load characteristics exceed one or more of the predefined thresholds.

14. The system of claim 9, wherein the exciters, the harvesters, and the controller are adaptable and scalable for different sized pallets and pallet racks.

* * * * *